Figure 3:
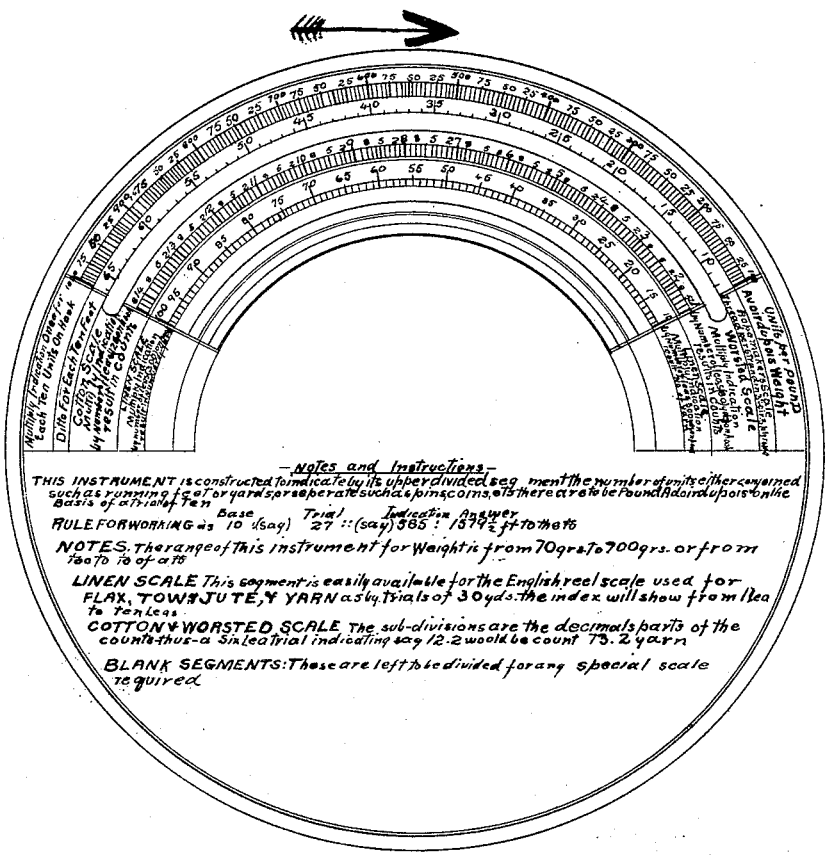

(No Model.) 2 Sheets—Sheet 1.
M. H. TOMKINS.
INDICATING MACHINE.
No. 523,735. Patented July 31, 1894.
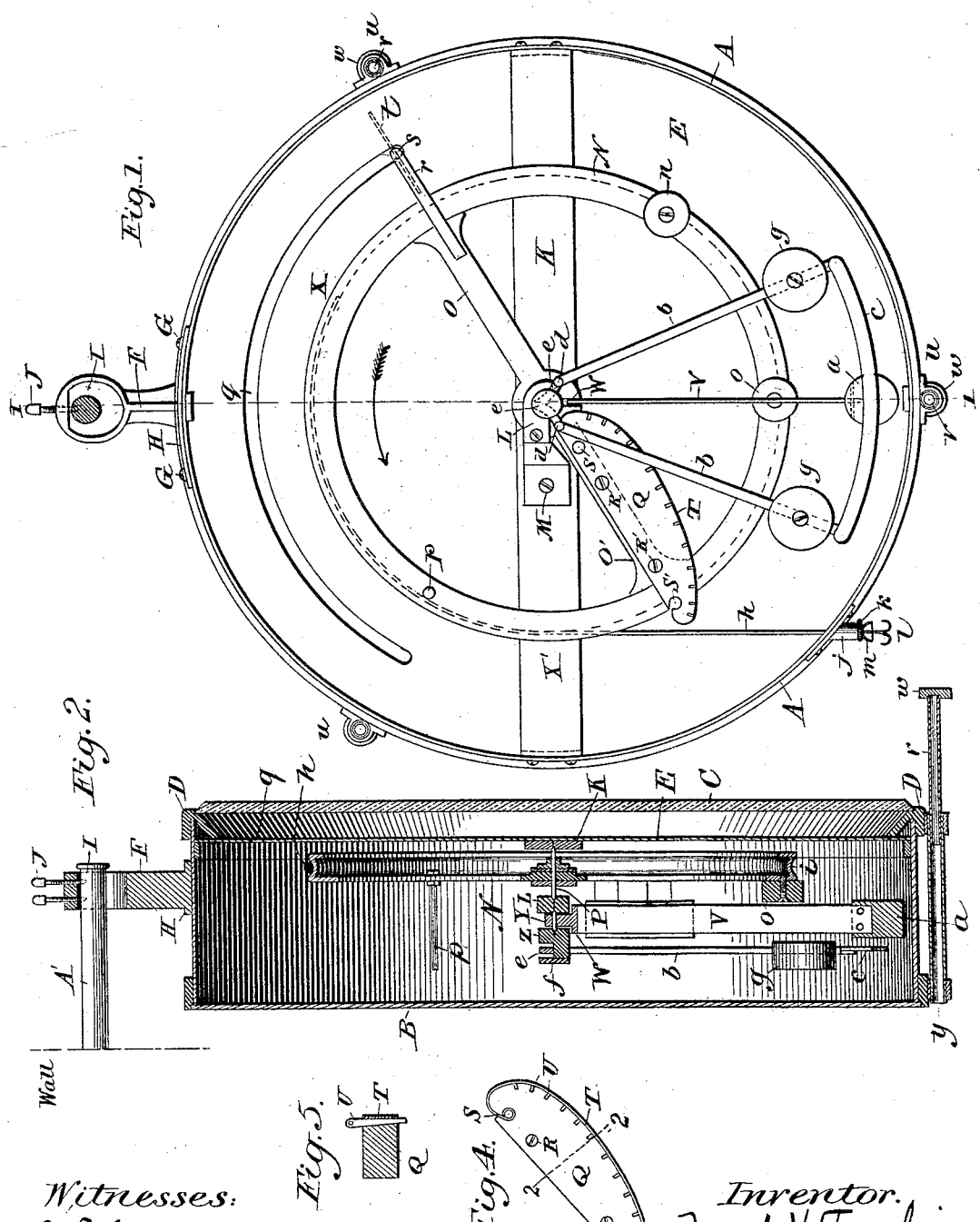
Witnesses:
E. Simpson.
John E. Lacy.
Inventor.
Mark H. Tomkins.
by Phillips Abbott
Atty.
THE NORRIS PETERS CO., PHOTO-LITHO., WASHINGTON, D. C.

(No Model.) 2 Sheets—Sheet. 2.

M. H. TOMKINS.
INDICATING MACHINE.

No. 523,735. Patented July 31, 1894.

Witnesses
John E. Lacey.
E. Simpson.

Inventor
Mark H. Tomkins
by Phillips Abbott
Atty.

UNITED STATES PATENT OFFICE.

MARK H. TOMKINS, OF NEW YORK, N. Y.

INDICATING-MACHINE.

SPECIFICATION forming part of Letters Patent No. 523,735, dated July 31, 1894.

Application filed December 12, 1893. Serial No. 493,480. (No model.) Patented in England October 25, 1892. No. 19,190.

*To all whom it may concern:*

Be it known that I, MARK H. TOMKINS, a subject of the Queen of Great Britain, residing in the city of New York, county and State of New York, have invented a new and useful Indicating-Machine, for certain features of which I obtained a patent in Great Britain, No. 19,190, bearing date October 25, 1892.

Of my present invention, the following is a specification.

My invention relates to a new and improved instrument for indicating the length or quantity of yarn, twine tape or other evenly elongated substance, to a given weight, and also to determine the number of any articles there are to a given weight, the same being determined by my instrument by weighing thereon a single article or, if the occasion requires, a plurality of such articles, it being immaterial whether the substance, the number of which to a given weight, it is desired to know, are in a single piece, or in a number of pieces.

The characteristic feature of my invention, and that which differentiates it from all other measuring devices known to me, is that, owing to its peculiar construction, the pound (in the case illustrated) which may be taken as the ultimate unit of measurement, is operated under the decimal principle. I do not mean to say that this characteristic feature is the essential feature of my invention, but that it is a characteristic feature of the operation of my improved apparatus.

To more particularly describe the purpose of the invention, I will state that its object is to provide an instrument, which will indicate the number of lineal feet, inches or other units that there are to the pound avoirdupois, of any description of yarn, twine, twist, tape, wire, or other evenly elongated substance, or the number of units, as for instance, coins, screws, shot, or any other article, of superficial or cubic inches or units, which will be required to make up a pound avoirdupois, the same being determined by weighing upon my instrument one or more of such articles.

It is obvious that the instrument is not limited to the pound avoirdupois as the ultimate weight; it may be adapted for a greater or less ultimate weight, as for instance an ounce or a ton. Hitherto, it has been usual, in order to ascertain the number of feet or other lineal measure to a pound, or the number of articles to the pound, to measure off a given length, or take the desired number of the articles and weigh them in the ordinary way. This method in a multitude of instances in the arts and manufactures is wasteful, laborious, time-taking and frequently incorrect.

Referring now to the drawings: Figure 1, is an elevation of the invention as seen from the back, the rear plate of the casing being removed. Fig. 2, is a vertical section, taken on the lines 1, 1, of Fig. 1. Fig. 3, is a front view or elevation of the dial of the instrument. Fig. 4, is a detail, shown in elevation of the cam and weight. Fig. 5, is a detail taken on the line 2 2, of Fig. 4.

A is the case which incloses the mechanism. It is preferably made of sheet brass, and from six inches to a foot in diameter, depending upon the size and capacity of the instrument, (of course very large instruments would be made of other material and of larger size.)

The instrument has the general appearance of an ordinary circular clock or barometer. The casing may be made, however, of any preferred material.

B is the back of the instrument, which preferably is removable.

C is a glass front, set in a bezel D, which is fastened to the casing A in any suitable manner.

E is the dial.

F is a bow or support for the instrument. It is fastened, as by rivets or screws G and plate H to the casing A, and at its upper part it is ring shaped, as at I, and through the metal on the upper part of the ring, two set screws J extending from the outside to the inside of the ring, are placed for a purpose hereinafter explained.

K is a bar, forming part of the frame of the instrument.

L is a peculiarly shaped part or bracket, fastened by a screw or pivot M to the cross bar K.

N is a ring supported upon transverse spokes O, O', and turning upon pivot P, which is journaled in the cross-bar K, at one end, and in the bracket L at the other.

Q is a cam shaped piece of material, fastened to the spoke O' by screws R, R'. The construction of this cam is best seen in Figs. 4 and 5.

Q is the main or body portion of the cam and at each end of it are two cavities S and S'.

T is a piece of metal, preferably spring brass or its equivalent, which incloses the face or cam shaped edge of the cam Q. The ends of this piece of metal conform generally to the shape of the ends of the cam and the extreme ends are coiled so as to approximate to the shape of recesses S, S' in the cam Q, in order that they may fit into those recesses under spring pressure.

U, U, &c., are a series of wedge shaped pieces of metal or other suitable material, which are set into transverse slits in the edge of the cam.

V is a tape or flat chain, which may be of textile fabric or any preferred sort of metal, as desired. It is attached to a hanger W, which is supported upon a pivot Y, introduced in the bracket L, so that it has exceedingly free swinging motion upon that pivot; it is embraced between the part of the bracket marked L in Fig. 2 and the part marked Z in that figure.

$a$ is a weight attached to the lower end of the tape or flat chain V.

$b, b$ are two rods connected at their outer ends by a web $c$ and at their upper ends are pivoted at $d, d$ to an inverted V-shaped piece $e$, which at its intersection engages with a knife edge $f$ on the brackets L.

$g, g$ are two weights attached to the rods $b, b$ respectively.

$h$ is a cord which rests in a groove $i$ made in the ring N, and is attached to it, as at X, Fig. 1, after making, say, a third or a half the circuit around the groove. This cord $h$ leaves the ring N at one extremity of its horizontal axis, as at X', Fig. 1, and drops thence vertically, passing through a tubular orifice $j$ made in the side of the case A (see Fig. 1). The mouth of the tube $j$ is provided with a sealing ring $k$, which may be made of rubber or felt or any equivalent substance.

$l$ is a metallic hook or clip attached to the end of the cord $h$, having a concavo convex shell $m$ of any suitable material at its upper end, which is adapted to close against the sealing ring K, to prevent the entrance of dust.

It is evident that a scale pan or gripping device of any kind may be substituted for the hooks $l$ depending upon the character of the material which is to be tested upon the instrument. In fact, a device, embodying hooks, a scale pan and a gripping device, one or more of them may be permanent attachments to this terminal. $n$ is a weight that is fastened to the ring N by an adjustable attachment, so that it may be shifted somewhat. It is not essential, however, that this weight should be so attached to the ring as to be adapted to frequent change of position, because the adjustment that I refer to is merely the adjustment during assemblage of the apparatus. In other words, it is a shop regulation of the machine and not a periodical change in it in the hands of the user. Therefore, this counterpoise may be fastened with the screw, which is threaded into the ring, or in any other desired manner. Its purpose is to counterbalance the weight of the cord and the terminal $l, m$.

$o$ is another weight rigidly fastened at near the lowest point in the ring N, which acts as the initial resistance to the operation of the instrument.

$p$ is a pin projecting rearwardly from the face of the ring N, and $q$ is a slot in the dial.

$r$ is an indicator arm, soldered or otherwise fastened to the ring, which has a pin $s$ set at right angles at its outer end, which projects forwardly through the slot $q$ and on the end of the pin, outside of the dial is an indicator $t$, which may be of any preferred form, the one indicated on the drawings is the one I prefer.

$u, u, u$ are three devices which I term draw pins. They are simply metallic pins $v, v$, preferably provided with heads $w, w$, which are inclosed within tubular casings or sockets $y$, (see Fig. 2) fastened to the case A.

Referring to Fig. 3, which shows the face of the dial, it will be seen that upon it appear instructions for the use of the apparatus and a series of indices adapted to the different trades or classes of manufacture to which my invention is especially applicable.

The operation of the device is as follows: I prefer to support the instrument from a pin A' fastened in a suitable upright support, as for instance, the wall of a room. This pin should preferably be as nearly horizontal as possible, and in order to secure its proper position, I have devised a special form of support, which need not be here illustrated. On the outer end of the pin A', the ring I slips, and the instrument is made to assume a truly vertical position, by means of the proper adjustment of the set screws J, they being screwed inwardly or outwardly and bearing upon the upper surfaces of the pin A', whereby the desired result is obtained, and yet the instrument, as a whole, is allowed an oscillatory movement upon these set screws J. It may, however, if preferred, be secured in its correct position. The material operated upon whether it be so many lineal units of yarn, or the like, square inches or feet of textile material, or the like, or so many articles, sheets of paper, or the like, are attached to the holding devices $l, m$. Thereupon the ring $n$ rotates on its axis as indicated by the arrow in Fig. 1, the weight $o$ moving to the right, until the tape or flat chain V comes in contact with the face of the cam Q. Thereupon, owing to the shape of the cam, each increment of movement made by it, carries the point of the support for the weight $a$ farther and farther from the axial line, consequently adding a constantly increasing increment to the effect that the weight $a$ has upon the registration affected by the instrument. The pull of the cord $h$ is, of course, constant, since it always acts upon a lever or radius of the same length. If the weight of the material being determined be sufficient to rotate the ring N, so that the pin $p$ comes in contact with the left hand rod $b$, then the two rods $b, b$ and their weights $g, g$ and connecting pieces $c$ are brought into action and are swung likewise to the right. They all oscillate upon the knife edge $f$ which supports this triangularly shaped pendulum.

If, for any reason, it is ascertained that the cam fails to produce an accurate weighing, then the shape of its surface, which engages with the tape V may be altered at pleasure, by moving forwardly or backwardly across the face of the cam, the wedge-shaped piece U (see Figs. 4 and 5). If they be moved forwardly, then the contour of the cam will be correspondingly changed, because the metallic plate or ribbon T, which is supported upon these wedges will be projected at the places where the wedges are moved forwardly and correspondingly retracted, where the wedges are moved backwardly: the coiled ends of the metallic strip T, which are within the recesses S and S', yielding sufficiently to effect this purpose, and yet the resiliency of these ends will always hug the metal strip snugly down upon the wedges and make it conform to the exact contour given by their position. In this way, I secure local adjustment of the cam to compensate for any inaccuracies in the instrument, due either to mechanical construction or deficiencies in the material of which it may be made, or arising from contraction or expansion or for any other reason. My instrument, as will be seen, is dust tight. In fact, it is practically dust, water and air tight at all points, excepting at the tubular opening J. All that is desirable is to have it dust proof, and I accomplish this by means of the concavo convex shell $m$, which, as soon as the instrument is relieved of any weight upon the cord $h$ is automatically carried upwardly against the sealing ring $k$ thus dust is prevented from entering the instrument.

The purpose and operation of the pins $v, v, v$ are as follows: These pins are spaced a definite distance apart, say, twelve inches or six inches, or any other determined distance, and are used as a convenient means for quickly ascertaining the length of the piece of yarn or other similar material, which is to be tried upon the instrument. For so doing, the pins are taken hold of by their heads $w$, and are pulled outwardly beyond the face of the instrument, then the operator, holding the end of the yarn or other material against one of the pins, wraps it around the others, two, three, four, or any other number of times, and cuts it off opposite the starting pin, or at such other pin as desired. In this way, a convenient and always ready device is at hand for this purpose.

A peculiar feature of my instrument, and one which I believe has never been employed before, is, that although the weight of the material operated upon can be calculated by the information shown by the indices, nevertheless it more directly, and as its primary indication, determines the relation that the said substance has to the pound, which is the ultimate unit. That is to say, it does not tell the operator that a piece of yarn, ten feet long weighs so many grains, but it tells him how many pieces of that yarn, it will take to make a pound. For instance, if the index finger of the instrument stops opposite the figure 900 on the dial, as seen in the upper scale of figures, it will indicate to the operator nothing relative to the weight of that particular piece of yarn, (unless he stops to figure it out) but it does indicate to him that it will take ninety of those pieces of yarn to weigh a pound. Ninety and not nine hundred, because this special instrument, which I illustrate is adjusted to the decimal system, and figured for the requirements of the yarn industry, in a manner which need not here be described. So, also, if the index finger stops opposite the figure 700, it will be one hundred grains in weight or one-seventieth of a pound. Consequently seventy of the pieces, whether they be yarn or bullets or pennies or square inches of canvas will be required to make a pound. The intermediate graduated scales of figures are similarly adapted to the worsted and cotton trade, they being amenable to the same principle, although slightly different in detail, and the linen trade scale is shown by the innermost scale. I show other scales left blank so that, when desired, an index or scale for other trades or branches of business may be figured out and written in. I have my dials printed in the manner shown so that I may add one or more special indices when desired by a purchaser.

It will be seen that my device is exceedingly simple because in the first place, it embodies very few parts, and they are all of them, without exception, gravity acting in character. There are no springs nor other devices liable to get out of order, and when the instrument is once adjusted, it will operate indefinitely, without further attention, unless under extraordinary circumstances.

I wish it to be understood that I do not limit myself to the details of construction shown and described because, although they are preferred by me, nevertheless in certain particulars, equivalent constructions may be substituted and still the essentials of the invention be employed.

I claim—

1. In an instrument for determining the number of articles relative to a fixed weight, the combination of an index hand, mechanism for operating the same, a device for supporting the article to be tried, connected with said mechanism, and an index or dial graduated in equal divisions, the indices on the dial being arranged in reverse order, that is to say, from greater to less, whereby each successive division indicates a larger increment of weight than the preceding division, substantially as set forth.

2. In an instrument for determining the number of articles relative to a given weight, the combination of a centrally pivoted ring, a cam on the ring, a weight centrally supported by means of a flexible tape or like material which during the operation of the instrument engages with the said cam, and a cord, upon which the material to be tried is suspended, which engages with the periphery of the ring, substantially as set forth.

3. In an instrument for determining the number of articles relative to a given weight, the combination of a centrally pivoted ring, a cam on the ring, a weight centrally supported by means of a flexible tape or like material which, during the operation of the instrument engages with the said cam, a cord upon which the material to be tried is suspended which engages with the periphery of the ring, and a counterpoise attached to the ring, substantially as set forth.

4. The combination of a centrally pivoted ring, a cord for the support of the article being tried, which engages with the periphery of said ring, a cam fastened to the ring, a centrally supported band or tape which supports a weight, which engages with said cam, and a weight fixed upon said ring which affords initial resistance to the operation of the instrument, substantially as set forth.

5. The combination of a centrally pivoted ring, a cord for the support of the article being tried, which engages with the periphery of the ring, a cam upon the ring, a centrally supported tape or band, which sustains a weight, an auxiliary pendulum independently supported, but which is engaged by a device on the ring, and thereby brought into action at a predetermined time, during the rotation of the ring, thus increasing the resistance, substantially as set forth.

6. The combination of a case which incloses the mechanism, a centrally pivoted ring, means which offer resistance to the rotation of the ring, a cord for suspending the article to be tried, which engages with the periphery of the ring, all of said devices being within said case, an opening in the side of the case for the passage of said cord, and a device attached to the cord, which automatically closes said opening when the instrument is not in use, substantially as set forth.

7. The combination of a case which incloses the instrumentalities composing the instrument, and pins inclosed within devices attached to the case and adapted to be withdrawn therefrom for the purpose of measuring thereon yarns and the like, substantially as set forth.

8. The combination of a centrally supported ring, a cord or like device for supporting the material to be tried, a centrally supported weight, a cam on the ring, so located as to engage with the support for the weight during the rotation of the ring, and means to adjust the face of the cam, and to rigidly hold the same as adjusted, substantially as set forth.

9. The combination of a centrally pivoted ring, a centrally supported weight, a cam on the ring and an independent pendulum, the whole being constructed and arranged so that during the rotation of the ring, the cam first makes contact with the support for the weight, and during the further rotation of the ring, it engages with the pendulum, substantially as set forth.

10. The combination of a centrally pivoted ring, a centrally supported weight, a cam on the ring, an independent pendulum, the whole being constructed and arranged so that during the rotation of the ring, the cam first makes contact with the support for the weight and during the further rotation of the ring, it engages with the pendulum, a counterpoise and a fixed weight for initial resistance, both supported by said ring, substantially as set forth.

11. A cam, the surface of which consists of a movable metallic plate or strip and means to adjust the contour of said strip and rigidly hold the same as adjusted, substantially as set forth.

Signed at New York, in the county of New York and State of New York, this 9th day of December, A. D. 1893.

MARK H. TOMKINS.

Witnesses:
PHILLIPS ABBOTT,
JOHN E. LACEY.